United States Patent [19]

Epps

[11] Patent Number: 4,476,695

[45] Date of Patent: Oct. 16, 1984

[54] REFRIGERATOR CONDENSATION APPARATUS

[76] Inventor: Tim Epps, P.O. Box 1416, Pampa, Tex. 79065

[21] Appl. No.: 561,688

[22] Filed: Dec. 15, 1983

[51] Int. Cl.³ ............................................. F25B 43/00
[52] U.S. Cl. ......................................... 62/512; 62/513
[58] Field of Search .......................... 62/113, 513, 512

[56] References Cited

U.S. PATENT DOCUMENTS

| | | | |
|---|---|---|---|
| 3,779,036 | 12/1973 | Girardin | 62/512 |
| 3,827,249 | 8/1974 | Garland et al. | 62/512 |
| 3,848,425 | 11/1974 | Watkins et al. | 62/512 |
| 4,232,533 | 11/1980 | Lundblad et al. | 62/512 |

*Primary Examiner*—Ronald C. Capossela

*Attorney, Agent, or Firm*—Michael L. Parks

[57] ABSTRACT

An apparatus using refrigeration for separating gases which liquify and separate at reduced temperatures from natural gas which remains gaseous at such reduced temperatures having a 1st inlet for delivering the gas to be separated into a pre-cool transfer vessel for transferring the heat from the gases to be separated as they are passed therethrough, a 1st outlet connected to the pre-cool transfer tube for discharging the gases to be separated; a 2nd inlet for delivering gases at reduced temperatures; a flow way container connected to the 2nd inlet for receiving gases at reduced temperatures and positioned about the pre-cooled transfer vessel for the gases at reduced temperatures to be in non-contacting conductive relationship for the transfer of heat from the gases to be separated in the pre-cool transfer tube.

8 Claims, 7 Drawing Figures

REFRIGERATOR CONDENSATION APPARATUS

APPARATUS FOR REFRIGERATIONAL SEPARATION OF GASES

The present invention relates to an apparatus for separating hydrocarbon gases of different molecular structures utilizing the chilling of the gases without the coolant being in contact with the gases to be separated to cause precipitation and condensation of the heavier molecular hydrocarbons and water with the remaining gases of a small molecular nature staying in a gas state at the reduced temperatures, thereby separating the heavier hydrocarborn gases from the lighter hydrocarbon gases.

BACKGROUND OF THE INVENTION AND PRIOR ART

The conventional refrigeration units utilized for the separation of liquid hydrocarbons from natural gas utilizing the bubblecap system are well known in the art.

In the bubblecap prior art a chilled glycol was injected at the top of a separation tower and allowed to filter down through the tower. The natural gas having the liquids therein to be separated was injected from the bottom of the distilling tower to allow the chilled glycol to contact the liquid gases to be separated. Trays were provided along the walls of the tower for increased surface area and to create condensation points along the length of the tower. Thus, in the prior art the glycol coolant was in direct contact with the gases to be separated.

In this prior art the liquid hydrocarbons to be removed and the glycol coolants settled to the bottom of the tower in a liquid form and the natural gas was evacuated from the top of the tower.

Also in this prior art, deicers such as methanol were injected along the sides of the tower at various ports to prevent the formation of ice along the length of the tower and at the top of the tower where the bubble caps are located. The glycol, methanol and liquid hydrocarbons which were collected at the bottom of the towers were then separated from the hydrocarbons, but only about 50 percent of the glycol was returned in the separation process to the glycol unit for recirculation in the process. Thus, in the bubblecap process about 50 percent of the glycol is lost in the liquid hydrocarbons and must be added as makeup glycol to keep the bubblecap system in operation.

Further, the hydrocarbons were required to have the other 50 percent of the glycol refined out of them prior to further distillation of the liquid hydrocarbons.

Also in the bubble cap process methanol was injected up and down the walls of the tower to prevent ice formation which resulted in a relatively high consumption of methyl alcohol as a deicer in the bubblecap system of the prior art.

Also, even though a deicer was added in the form of methanol, occasionally ice does form in the prior art systems and since they rely on a mechanical bubble cap at the top of the tower to open and close there has been problems with the caps icing shut which closes down the whole system until the ice could be cleared.

In the prior art so much re-refining and separating is required to remove the glycol and methanol from the liquid hydrocarbon that it utitlized excessive energy in its operation.

Also, the prior art is relatively expensive because of the size of the equipment necessary to be utilized and its mechanical complexity. Further, because of its large size it was very difficult to set up and it required a certain amount of field work to bring the unit on stream when it was installed.

Also in the bubblecap system of the prior art the minimum efficiency for the operation of these type units was a million cubic feet of gas per day, and while they may be operated below that limit of volume, at that point they are being run very inefficiently.

Further the prior art patents require that the systems be operated at a positive pressure of at least 2 pounds per square inch.

Further, in the prior art the methyl alcohol was injected at the condensation point and, therefore, had to be injected in larger quantities because it was being injected at the point of ice formation and required larger quantities in order to have the beneficial effect of the methanol present at the formation of the ice crystals, which were already in the process of forming at the time of injection.

SUMMARY OF THE INVENTION

It is the object of the present invention to provide an apparatus using non-contacting coolants for separating gases which liquify and separate at reduced temperatures from natural gases, which remain gaseous at such reduced temperatures while providing an apparatus which is smaller, more economical and efficient to achieve the separation of liquid hydrocarbons from natural gas.

At least one object of this invention is to remove the use of glycol in contact with the gases to be separated in the refrigeration system and thereby eliminating the use of glycol and the re-refining required by the prior art to regenerate the glycol.

It is the further object of this invention to provide an apparatus which utilizes a reltively low energy requirement and thus, provides economy of operation.

It is also an object of this invention to provide liquid hydrocarbons which do not have to be refined to remove the glycol prior to the distillation of the liquid hydrocarbons into their various products.

A further object of this invention is to provide a unit that is more efficient in the use of deicers such as methanol.

It is yet another object of this invention to provide the deicing effect at a lower volume of methanol consumption which reduces the amount of methanol which finds its way into the liquid products.

Yet a further object of this invention is to provide an apparatus which will not ice up during operation, but if icing does occur, it does not necessarily shut the unit down and it may continue to be operated while removing any ice that has formed.

It is a further object of this invention to provide the injection of methanol prior to the gases to be separated being chilled thereby allowing thorough mixing, which again reduces the quantity of methanol necessary to prevent ice formation.

It is a further object of this invention to provide a relatively inexpensive piece of equipment and thus provide a faster payback for the cost of installation.

It is yet a further object of this invention to provide an apparatus which can operate on relatively low volumes of cubic feet per day and still be effective for generating liquid hydrocarbons.

It is a further object of this invention to have the total appartus skid-mounted so that the apparatus may be delivered to the site and started within a short period of time.

It is a further object of this invention to provide an apparatus using the skid-mounted device for reducing the cost of transportation from site to site.

It is a further object of this invention that this invention can be run at a vacuum and still be successfully operated.

BRIEF DESCRIPTION OF THE DRAWINGS

Other objects, features, and advantages of the present invention will become apparent from the following detailed descriptions taken in conjunction with the attached drawings wherein.

DETAILED DESCRIPTION OF THE INVENTION

Figure 1:
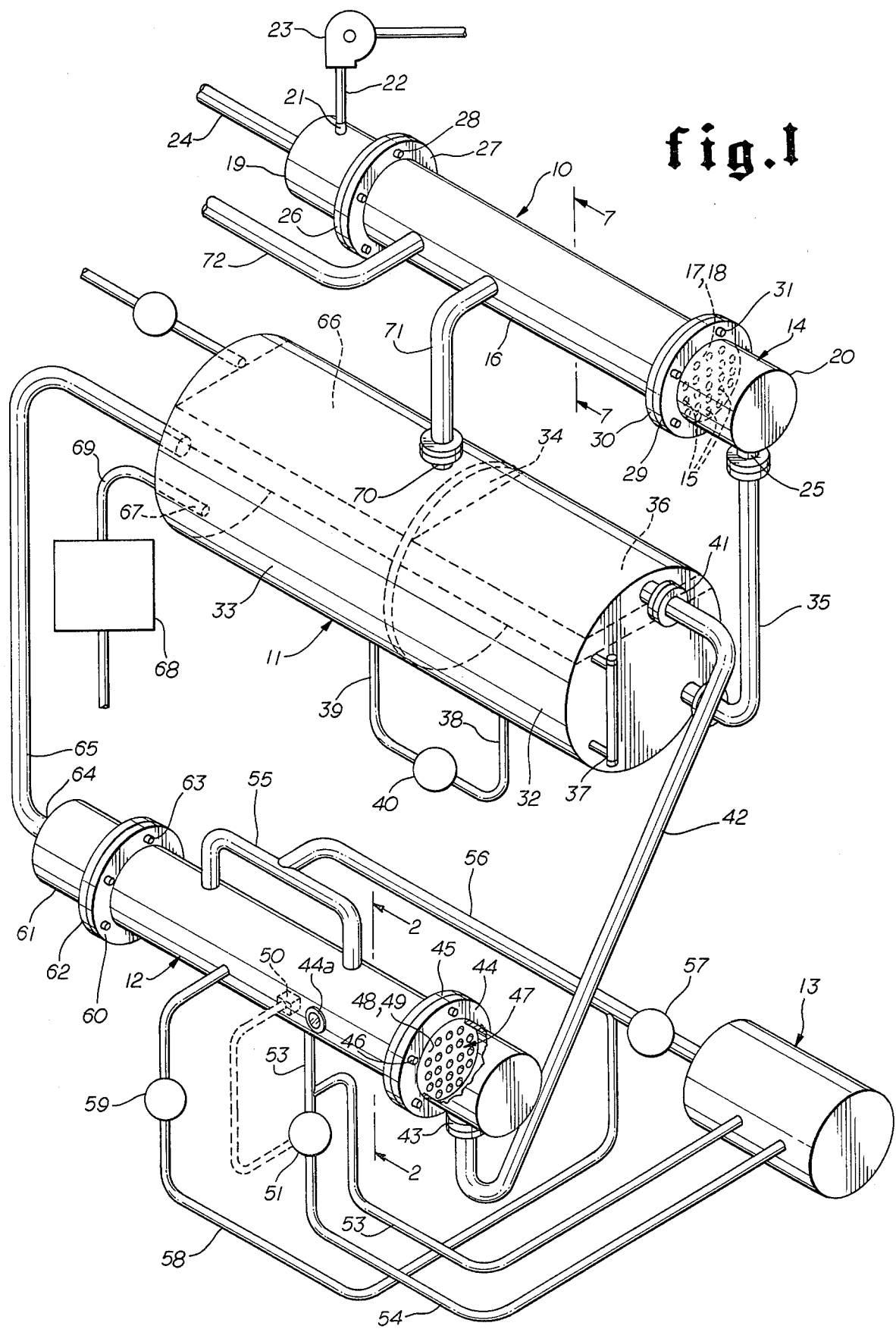
FIG. 1 is a preferred embodiment of this invention in a perspective view.
Figure 6:
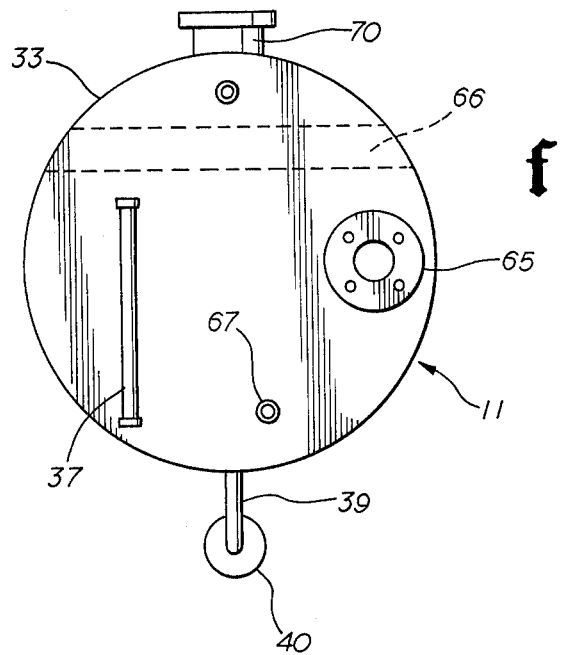
FIG. 6 is the end of the chamber showing in phantom drawings.
Figure 7:
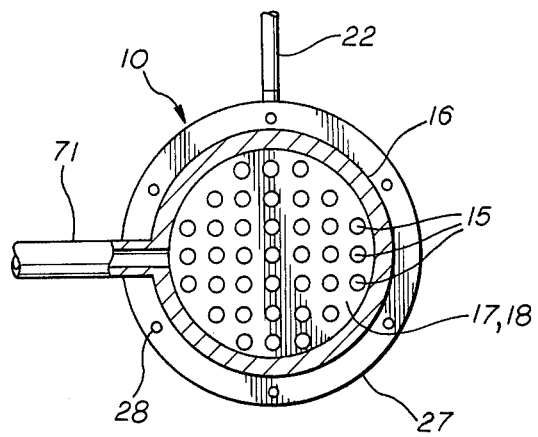
FIG. 7 is a cross-sectional view of the pre-cooler vessel.
Figure 2:
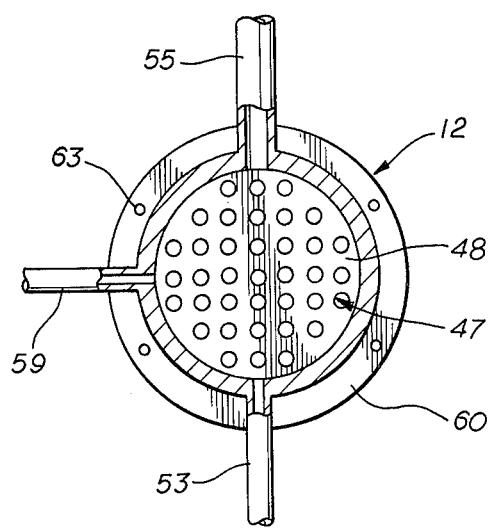
FIG. 2 is a cross-sectional drawing of the super chiller vessel showing a preferred embodiment of the super chiller.
Figure 3:
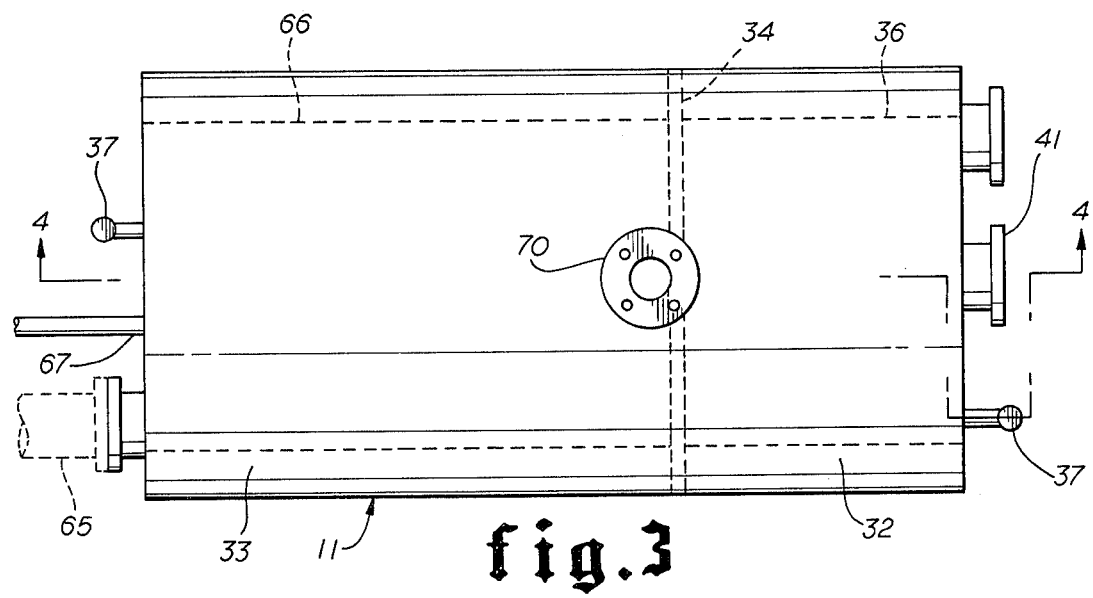
FIG. 3 is a top view of the process vessel for separating the liquid hydrocarbons.

The apparatus of this invention is more particularly described in general as having a pre-cooler vessel 10 connected in fluid communication with a process vessel 11 which is connected in fluid communication to a super chiller vessel 12. A cooler apparatus 13 is connected to super chiller vessel 12 for supper cooling the super chiller vessel 12.

The pre-cooler vessel 10 is formed from a pre-cooled transfer vessel 14 composed of a series of tubes 15 which are located inside a flow way container 16. The tubes 15 are mounted in spaced apart relation from each by a 1st and 2nd disk bracket 17 and 18. These 1st and 2nd disk brackets 17 and 18 and the tubes 15 are connected so as to become an integrated unit which may be easily inserted or removed from the flow way container 16.

Connected to either end of the pre-cooler vessel 10 is a 1st inlet manifold 19 and a 2nd outlet manifold 20. Also connected to the pre-cooler is a 1st inlet 24 and a 1st outlet 25 for respectively delivering or removing the gases to be separated from the pre-cooler vessel 10. In the embodiment shown in FIG. 1 the 1st inlet manifold 19 and the 2nd outlet manifold 20 are connected directly to the 1st inlet 24 and 1st outlet 25 respetively to form units for attachment to the flow way container 16.

Also in FIG. 1, the 1st inlet manifold 19 has attached thereto an injector 21 which is connected in fluid communication with a deicer tube 22. The deicier tube 22 is connected to pumping apparatus 23 which is then connected in fluid communication to a deicing reservoir, not shown in the drawing, containing small molecular organic alcohols such as methanol.

In the embodiment shown in FIG. 1 the gases to be separated are delivered at ambient temperatures through 1st inlet 24 and 1st inlet manifold 19 to tubes 15 where heat is drawn off as these gases are passed therethrough. By the time these gases to be separated leave the pre-cooler vessel 10, their temperatures have been reduced to temperatures ranging from 10° F. to 50° F. The gases delivered to the 1st inlet 24 and the 1st inlet manifold 19 have the low molecular alcohols such as methanol injected into the 1st inlet manifold 19 by the injector 21.

The injected particles of the low molecular alcohol such as methanol are thus mixed and agitated by the injection process from the injector 21 and the flowing of the gases to be separated within the 1st inlet manifold 19. It should be understood that by the time the gases to be separated reach the freezing point of water they will be substantially mixed with the deicer to prevent ice from forming anywhere throughout the system.

The 1st inlet manifold 19 is also connected to the flow way container 16 by means of a 1st inlet manifold flange 26 connected to 1st inlet manifold 19. In this embodiment the 1st inlet manifold flange 26 is joined with a 2nd flange 27 which is attached to flow way container 16. A series of bolts 28 are passed through the 1st inlet manifold flange 26 and 2nd flange 27 for securing inlet manifold flange 19 and the 1st inlet 24 to the flow way container 16. Once these bolts 31 are secured, pre-cooled gas may be circulated about the tubes 15 located inside flow way container 16 without mixing with the gases to be separated as these gases pass therethrough.

The 2nd outlet manifold 20 has formed on one end thereof a 2nd outlet manifold flange 29 which matches a 3rd flange 30 formed on the flow way container 16. Bolts 31 are provided and passed through the 2nd outlet manifold flange 29 and 3rd flange 30 for securing the assembly. This also has the effect of sealing the tubes 15 flowing the gases to be separated from the gases to be used as coolant.

Connected to the 2nd outlet manifold 20 is the 1st outlet 25 which passes the pre-cooled gas to the process vessel 11 by means of line 35.

Figure 4:
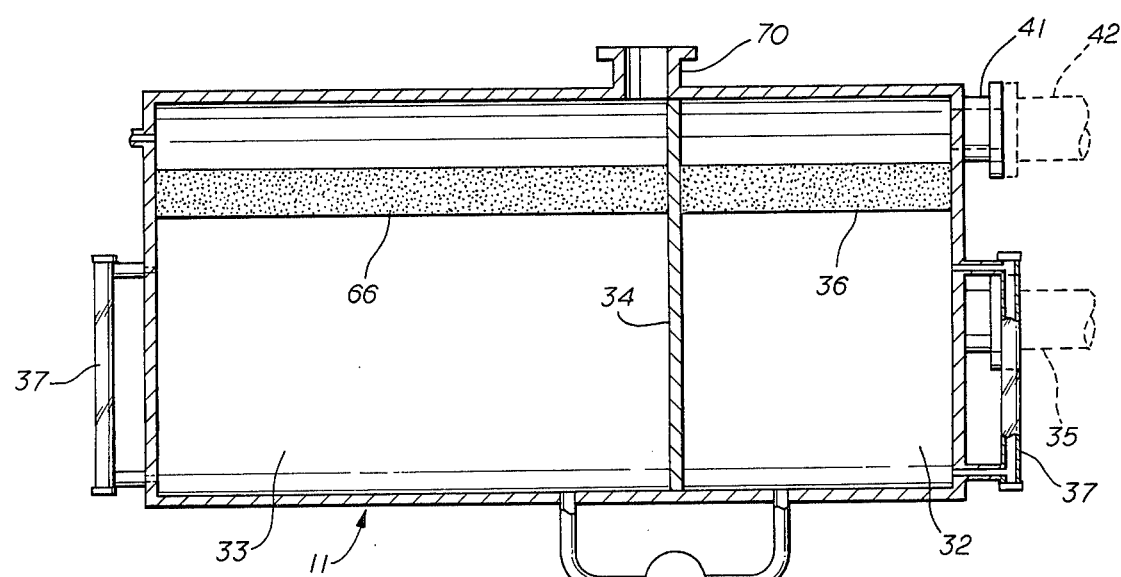
FIG. 4 is a cross-sectional view of FIG. 3.
Figure 5:
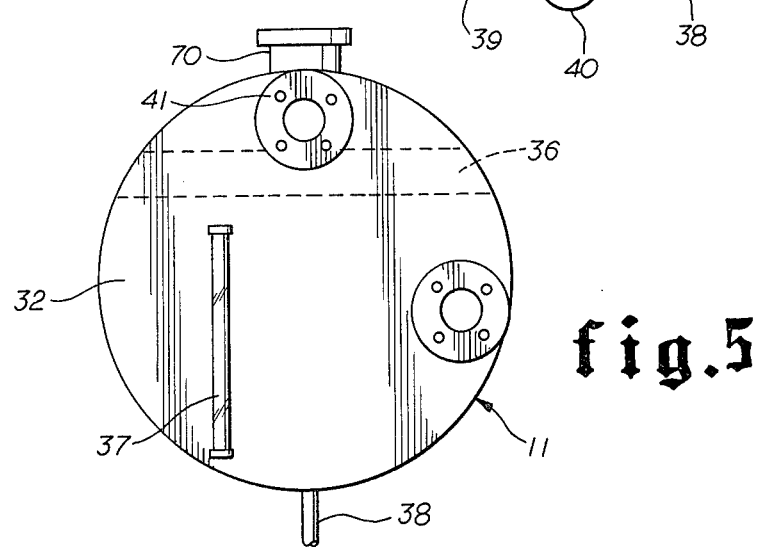
FIG. 5 is the end view of the process tank in phantom section.

The process vessel 11, at least in the embodiment of FIG. 1 and 4, is a single vessel that is formed into two separate chambers. One chamber 32 being a chamber for providing a condensing zone for the condensation of water and other gases which condense after the transfer of heat from the pre-cooler vessel 10 and the other being a process tank 33 for processing and providing a zone for condensation of any remaining liquids in the gases to be separated after being reduced to a significantly lower temperature. The chamber 32 and the process tank 33 formed from a single vessel which is separated by a wall 34 shown in FIG. 1 and FIG. 4 of the drawing. Thus, the pre-cooled gases containing the liquids to be separated in flow way passage 28 are fed out of 1st outlet 25 to chamber 32 by line 35.

Chamber 32 provides a quiet zone for the condensing of water vapor and hydrocarbons which will condense out at the reduced temperature of the gases in chamber 32. Also provided within chamber 32 is a stainless steel sponge pad 36 which is shown in phantom lines in FIG. 1 and cross section in FIG. 4. These stainless steel sponge pads 36 are for the purpose of giving increased surface area for the condensation formation thereon and for dripping condensed liquids back to the bottom of the process chamber 32.

A sight glass 37 is connected to the end of the chamber 32 for giving an operator a visable indication of the level of condensate in the chamber 32. The sight glass 37 as shown in FIG. 4 shows that the sight glass 37 is open to the chamber 32 for the liquid level in the chamber 32 to be substantially the same as in the sight glass 37.

Located at a low point in the chamber 32 is a 1st discharge port 38 which is connected to chamber 32 for the removal of liquids from the bottom of chamber 32. At a low point in the process tank 33, which is proximate to chamber 32 in this embodiment, is an input port 39.

A valving system 40 is provided between the 1st discharge port 38 and the input port 39 in this embodiment which provides for the movement of liquids from chamber 32 to process tank 33. The valving system 40, thus provides a means for balancing the liquid levels between the process tank 33 and the chamber 32 depending on the amount of water and liquids present in the gas to be processed.

Connected at a relatively high point in chamber 32 is a 3rd outlet 41 for discharging the remaining gases to be separated into line 42. Line 42 is in turn connected to a 3rd inlet manifold 43 for receiving the gases from line 42.

The gases received from line 42 and 3rd inlet manifold 43 are delivered to a series of tubes 47 which are mounted in spaced apart relation from each other by 3rd and 4th disk brackets 48 and 49. These 3rd and 4th disk brackets 48 and 49 and the tubes 47 are connected and become an integrated unit which may be easily inserted or removed from the super chiller vessel 12.

The 3rd inlet manifold 43 is provided with a 3rd manifold flange 44 for connection to the super chiller vessel 12. The super chiller 12 has provided on one end a 1st super chiller flange 45, which matches with the 3rd manifold flange 44 for attachment by bolts 46 being passed therethrough. Once these bolts 46 are secured, coolant may be circulated about the tubes 47 located inside the super chiller vessel 12 without mixing with the gases to be separated.

The super chiller vessel 12 also has a sight glass 44a along its surface to provide a view of the coolant which is passed through the super chiller vessel 12. This sight glass 44a is provided for the operator to obtain a visual check that the coolant is flowing in a proper manner and that there has been no loss of coolant.

Also provided along the surface is a sensor 50 which is mounted in the wall of the super chiller vessel 12 for sensing the temperature and transmitting the sensed temperature to a control valve 51.

The control valve 51 provides for increasing or decreasing the flow of super chilled coolant to the super chiller 12, which thus controls the temperature in the super chiller 12. Two chill lines 53 and 54 respectively, are connected to a 5th inlet 52. The 5th inlet is connected to a super cooler apparatus 13 for supplying cooling super coolant for delivery through a chill line 53 and 54 to the super chiller vessel 12. The chill line 53 provides a continuous flow of coolant and the flow in chill line 54 is controlled by the control valve 51. It should be understood that with the opening of control valve 46, additional quantities of the coolant can be supplied to the super chiller vessel 12 which reduces the temperature therein.

Also connected to the super chiller 12 is a suction manifold line 55 for removing the coolant from the super chiller vessel 12. The super cooled coolant removed from super chiller vessel 12 is delivered through the suction manifold 55 to line 56 for return to the super cooler apparatus 13. A control valve 57 is located in line 56 for controlling the suction feed back to the super chiller 13, thus controlling the rate of feedback of the coolant to the super cooler apparatus 13.

Also connected to super chiller vessel 12 is a suction control line 58. This suction control line 58 aids in providing additional ability to control the removal of super coolant from the super chiller vessel 12 by a controlling valve 59.

The super chiller vessel 12 is connected on its other end by a 5th outlet 64 and a 3rd outlet manifold 61 for discharging the gases from the super chiller vessel 12. Also, the 3rd outlet manifold 61 is provided with a 3rd outlet manifold flange 62 for use in attaching 3rd outlet manifold 61 and 5th outlet 64. The 3rd outlet manifold flange 62 is matched up with a super chiller flange 60 and has bolts 63 passed therethrough for fastening. It should be understood that using the bolt 63 on flange arrangement for the manifolds on the super chiller vessel 12 and the pre-cooler vessel 11 are important in that if any blockages occur or the tubes fail in the super chiller vessel 12 or pre-cooler vessel 11 such that the coolants contact the gases to be separated, the bolts on flange arrangement provide quick and easy access for repair. The 5th outlet 64 discharges the super chilled gas to the process tank 33 by means of line 65.

In the process tank 33 the super cooled gases to be separated are allowed to stand in the process zone and proceed to condense. The condensation is aided by a quiet zone with increased surface area provided by stainless steel sponge pads 66. These stainless steel sponge pads 66 also provide extra surface area for the condensation of the gases which will condense at the super cooled temperature. A 2nd discharge port 67 is connected at the low point of process tank 33 for the removal of the condensate as the process vessel begins to fill with the liquified natural gas. These liquids are removed to a separator 68 by a line 69 where the liquid natural gases and water are separated from each other. The super cooled natural gas remaining in a gaseous state in process tank 33 are then removed from the process tank 33 by a 7th outlet 70 for return to the pre-cooler vessel 10 through a line 71. These super cooled gases are used as a coolant in the pre-cooler vessel 11 for pre-cooling the gases to be separated which are being received into the pre-cooler vessel 10. The natural gases which serve as a pre-cooler coolant are then removed by 2nd outlet 72 which is attached to the pre-cooler vessel 10.

It should be understood that by utilizing the super cooled gases which have been separated as a pre-cooler for the cooling of the incoming gases to be separated an efficiency is obtained in that the natural gases are warmed to a more usable temperature, and at the same time as the process of warming these gases occurs, they are taking the heat from the gases which are being supplied for pre-cooling purposes.

It should be further understood that from the foregoing description that the coolant never contacts the gases to be separated and thus, there is no mixing of the two as in the prior art, which eliminates the need for their separation as required by the prior art.

It should also be understood that in the preferred embodiment all the apparatus of this invention can be skid mounted for easy installation and movement.

Further, as the coolant does not contact the gases to be separated and is run in a closed system unto itself, the gases to be separated can be operated at a vacuum provided that they can be flowed through the system.

I claim:

1. An apparatus using refrigeration for separating gases which liquify and separate at reduced temperatures from natural gas which remains gaseous at such reduced temperatures comprising;
   (a) a 1st inlet means for delivering said gases to be separated;
   (b) a pre-cool transfer means connected to said 1st inlet means for transfering heat from said gases to be separated as said gases to be separated are passed therethrough;
   (c) a 1st outlet means connected to said pre-cool transfer means for discharging said gases to be separated;
   (d) a 2nd inlet means for delivering gases at reduced temperatures;
   (e) a flow way means connected to said 2nd inlet means for receiving said gases at reduced temperature and positioned about said pre-cool transfer means for said gases at reduced temperature to be in noncontacting conductive relationship for the transfer of heat from said gases to be separated in said pre-cool transfer means;
   (f) a 2nd outlet means connected to said flow way means for discharging said gases;
   (g) a chamber means connected in fluid communication with said 1st outlet means for providing a condensing zone for condensation of water and other gases which condense after the transfer of heat from said gases to be separated in said pre-cool transfer means;
   (h) a 3rd outlet means connected to said chamber means for discharging said gases to be separated;
   (i) a 1st discharge port means connected to said chamber means at a low point therein for removing condensed liquids from the chamber means;
   (j) a super coolant transfer means connected in fluid communication with said 3rd outlet means for receiving said gases from said chamber means and for super cooling said gases while therein;
   (k) a 4th outlet means connected to said super coolant transfer means for discharging said super cooled gases;
   (l) a cooling means for providing super cooled coolant;
   (m) a 5th inlet means connected in fluid communication with said cooling means for receiving said super cooled coolant from said cooling means;
   (n) a super chiller means connected to said 5th inlet means for receiving and for positioning said super cooled coolant about said super coolant transfer means for said super coolant to be in non-contacting conductive relationship for super cooling said gases by the transfer of heat from said gases to be separated;
   (o) a 6th outlet means for returning said coolant to said cooling means for recooling said super cooled coolant;
   (p) a 5th outlet means connected to said super chiller means for discharging the super cooled gas;
   (q) a process tank means connected in fluid communication with said 5th outlet means for providing a process zone for the condensation of any remaining liquids from said gases at the reduced temperature;
   (r) a 7th outlet means connected to said process tank means for delivering said gases at reduced temperature to said 2nd inlet means; and
   (s) a 2nd discharge port means connected to said process tank means at a low point therein for removing the liquids from said process tank means.

2. The apparatus of claim 1 further comprising;
   (a) a deicer means connected to said 1st inlet means for introducing deicing substances prior to cooling said gases to be separated for preventing the formation of ice during the cooling or super cooling of the gases to be separated;
   (b) a separator means connected to said 1st and 2nd discharge port means for receiving and separating the liquified gases from the water condensed from the gases; and
   (c) a control means for controlling the temperature in said super chiller means by controlling the level of the super cooled coolant in said chiller means.

3. The apparatus of claim 2 further comprising;
   (a) a 1st means connected inside said chamber means for providing increased surface area for the initiation and facilitation of condensation of water and other gases which condense after the transfer of heat from said gases; and
   (b) a 2nd means connected inside said process tank means for providing increased surface area for the initiation and facilitation of condensation of any remaining liquids from the gases at the reduced temperature 4. The apparatus of claim 3 further comprising;
   (a) a pump means connected to said 1st and 2nd discharge port means for removing the liquids from said process tank means and said chamber means; and
   (b) a control means connected in fluid communication to said process tank means for activating said pump means off and on for the removal of the liquids formed therein.

5. The apparatus of claim 4 wherein said deicer means further comprises an atomizer means for the injection of substances as small particles for mixing with said gases to be separated for the prevention of ice formation during the cooling or super cooling of the gases to be separated.

6. The apparatus of claim 5 wherein said substance to be injected are small molecular organic alcohols.

7. The apparatus of claim 6 wherein said pre-cool means further comprises;
   (a) a 1st inlet manifold means connected to said 1st inlet means for receiving said gases and for providing a mixing chamber for said atomizer means injection of said deicer substances;
   (b) a 1st outlet manifold means connected to said 2nd outlet means for receiving said gases;
   (c) a series of tubular means connected in sealed relationship with said 1st inlet manifold means and said 1st outlet manifold means for flowing said gases to be separated therethrough and in spaced apart relation from each other for allowing the flow of the pre-cooled gases thereabout for maximum heat transfer.

8. The apparatus of claim 7 wherein said super coolant transfer means further comprising;
   (a) a 2nd inlet manifold means connected to said 3rd outlet means for receiving said gases and for even distribution thereof;
   (b) a 2nd outlet manifold means connected to said 5th outlet means for receiving said gases;
   (c) a series of tubular means connected in sealed relationship with said 2nd inlet manifold means and said 2nd outlet manifold means for flowing said gases to be separated therethrough and in spaced apart relation for allowing the flow of the super cooled coolant thereabout for maximum heat transfer.

* * * * *